May 14, 1946.                R. E. OSTLUND                2,400,253
                                TRAILER
                        Filed July 4, 1942            2 Sheets-Sheet 1

RICHARD. E OSTLUND.
        INVENTOR.
BY    Lester B. Clarke.
            ATTORNEY.

May 14, 1946.    R. E. OSTLUND    2,400,253
TRAILER
Filed July 4, 1942    2 Sheets-Sheet 2

RICHARD E OSTLUND
INVENTOR.
BY Lester B. Clark,
ATTORNEY.

Patented May 14, 1946

2,400,253

UNITED STATES PATENT OFFICE 2,400,253

TRAILER

Richard E. Ostlund, Lufkin, Tex., assignor to Lufkin Foundry & Machine Company, Lufkin, Tex.

Application July 4, 1942, Serial No. 449,796

3 Claims. (Cl. 296—28)

The invention relates to a trailer construction wherein the structural arrangement thereof has been devised with a view of obtaining a tension field beam where the vertical sheer load is taken by a thin web in diagonal tension, and the bending load is taken by horizontal top and bottom chords with vertical stiffeners to support the top and bottom chords.

With a construction of this sort it has been found that a simple and economical arrangement of the material results in an exceptionally strong trailer capable of carrying heavy loads and which presents a pleasing appearance and smooth exterior surface.

It is one of the objects of the invention to provide a particular wall assembly in which the bottom rub rail supports the wall which constitutes a thin wall sheet and vertical struts.

Another object of the invention is to provide a wall and rail assembly for trailers which will absorb the stresses in tension and bending.

Another object of the invention is to provide an assembly of top and bottom rails with a wall construction in combination with roof and end assemblies for trailers.

Still another object of the invention is to provide a bottom rub rail of particular configuration which will support the floor, crossbearers and the wall assembly.

Another object of the invention is to provide rail members of a particular configuration to accommodate the adjoining parts for welding attachment.

Other and further objects of the invention will be readily apparent when the following description is considered in connection with the accompanying drawings wherein.

Figure 4:
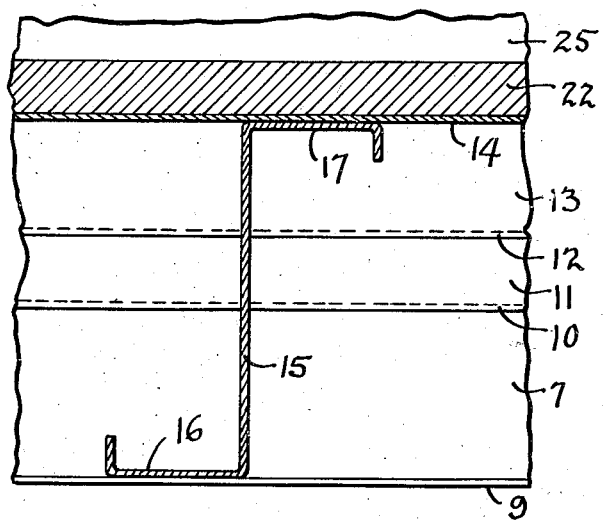
Figure 5:
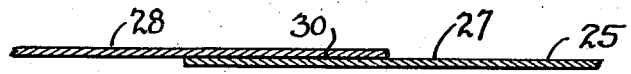
Figures 2, 3:
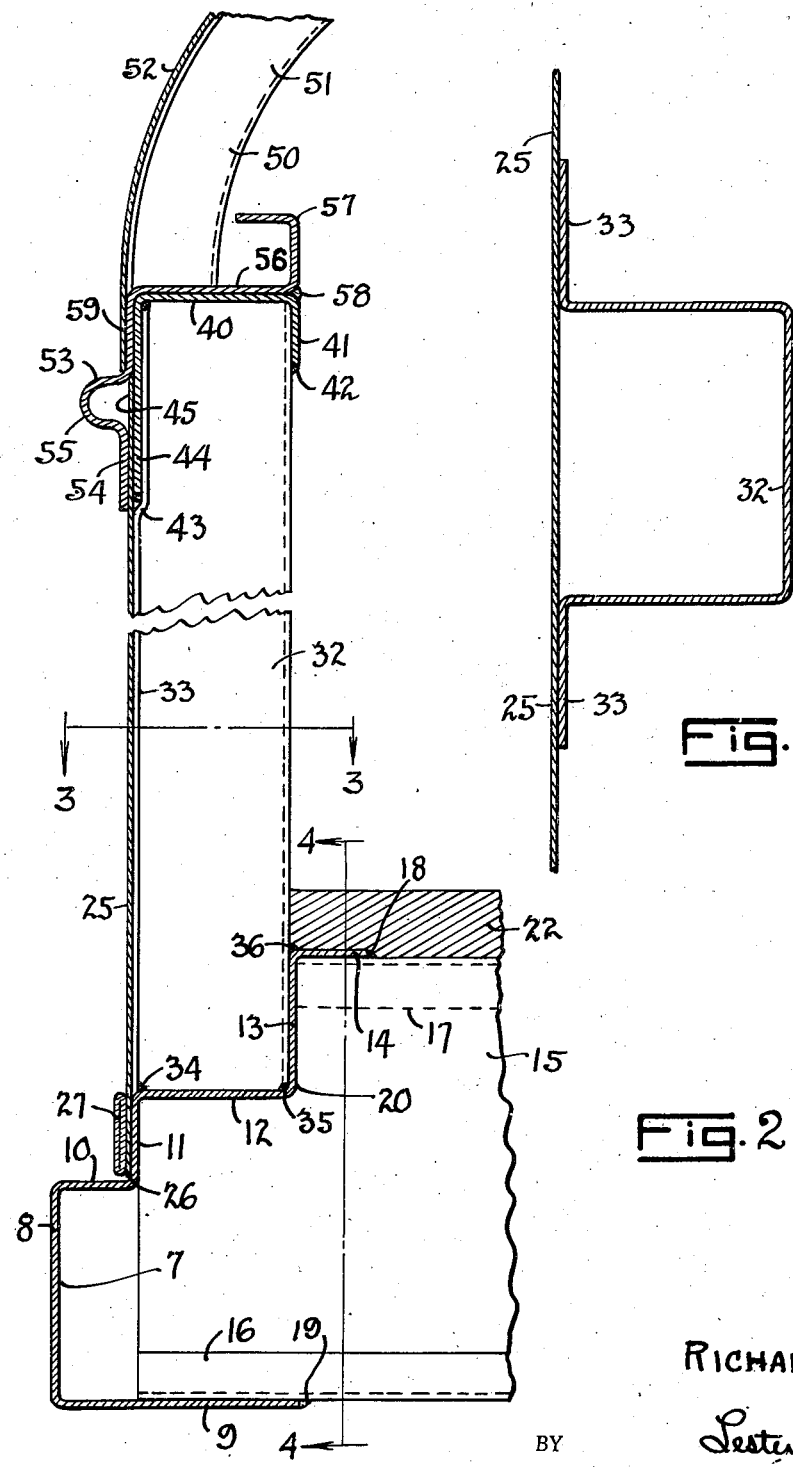
Fig. 2 is a vertical sectional view showing the bottom rail, side wall and roof detail.

Figs. 3 and 4 are sections taken on the lines 3—3 and 4—4, respectively, of Fig. 2;

Fig. 5 is a sectional detail showing the lap weld for connecting the wall sheets.

Figure 1:
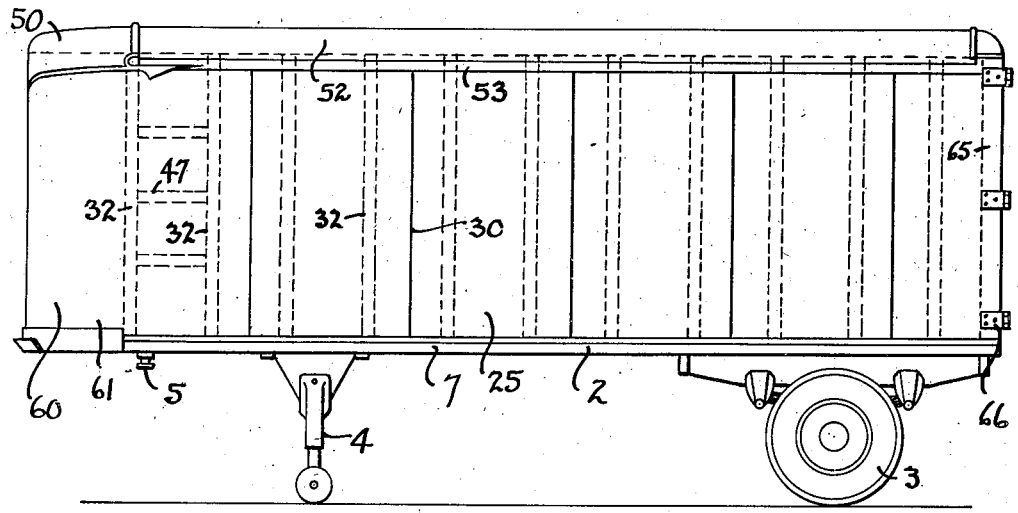
Fig. 1 is a side elevation of a trailer constructed in accordance with the invention.

In Fig. 1 the trailer is indicated generally at 2 and will be supported by the wheel construction 3 and a standard 4. A suitable king pin connection 5 is provided.

The body is an assembly of parts, and a sectional view in Fig. 2 illustrates the side construction whereby large, heavy loads may be carried by a structure made up with a minimum amount of material.

The principal portion of the trailer is the bottom rub rail 7 which is seen in transverse section in Fig. 2. This bottom rail has the rub portion 8 thereon which terminates in an inwardly directed bottom flange 9. The top of the rub portion extends inwardly at 10 and is then bent upwardly at 11 to form the strut seat at 12 which is a horizontal extension leading inwardly and which, in turn, has the upwardly directed extension 13 which terminates in an inwardly extending floor flange 14. The entire configuration, as seen in Fig. 2, is in the nature of an irregular channel. There will be two of these channels or rub rails 7 with the open channel portions facing each other. They will be spaced apart by a series of crossbearers 15 which are in the nature of beams extending transversely of the trailer.

These crossbearers may be structural members of a "Z" configuration, as seen in Fig. 4, with the bottom leg 16 extending into and overlying the bottom flange 9, as best seen at the bottom of Fig. 2. While the top leg 17 extends in under the top flange 14 and may be affixed thereto by a bead of welding material 18, the bead 19 serves to connect the bottom leg and the bottom flange. It will be noted that the ends of these crossbearers are cut away at 20 to interfit with the irregular configuration of the channel portions 11, 12 and 13. When the bottom rails and these crossbearers are assembled a rigid bottom frame for supporting the load of the trailer is provided, and the wooden flooring 22 may be disposed on these crossbearers and the floor flange 14.

In order to provide a longitudinal tension beam wherein the vertical sheer load will be taken by a thin web in diagonal tension, a thin wall sheet 25 is shown as being disposed with its lower end 26 on the top 10 of the rub rail. A decorative strip 27 may overlie the bottom of the sheet 25. The sheet 25 is in turn made up of the sections 27 and 28, as seen in Fig. 5, whose edges overlap to form the joint 30, as best seen in Fig. 5. If the side wall is in one continuous sheet, then, of course, the joints 30 will be unnecessary and the welding thereof may be omitted.

In order to provide vertical stiffeners for this longitudinal beam or wall 25, a series of vertical struts 32 are provided. These struts are in the form of channel portions with the outstanding flanges 33 thereon which will be welded to the wall structure 25.

In order to obtain a maximum of strength in the connection the vertical struts 32 are disposed on the strut seat 12 and the flanges 33 may be welded to the seat at 34 and 35 and the channel portions will be welded at 36 to the outer edge of the floor flange 14. In this manner the vertical web 13 is rigidly connected to the struts and maintains them in proper position to transmit stresses.

In order to rigidly assemble the upper ends of these struts 32 in position, the top rail 40 has been bent to a channel configuration with the short flange 41 overlying the tops of the channel portions 32 and has been welded at 42 thereto. The upper ends of the flanges 33 are stepped in at 43 so as to accommodate the long leg 44 of the top rail 40, and in this manner present a continuous outer face made up of the flanges 33 and the leg 44 of the top rail. The upper portion 45 of the side wall sheet 25 can be spot welded to the leg 44 so as to transmit stresses and retain the parts in proper position.

With this assembly a tension longitudinal beam has been provided wherein the vertical shear load will be taken by the thin web 25 in diagonal tension, and the bending load is taken by the horizontal top rail 40 and the horizontal bottom rail 7 which form chords to absorb the stresses.

The vertical struts 32 act as stiffeners to support the top and bottom chords or rails in proper position. It seems obvious that these side wall assemblies including beams 7, struts 32, the wall 25, and the top rail 40, can be made up as panels or subassemblies for ready connection to each other and to the crossbearers 15 so that the trailer can be assembled with a minimum of man-hours.

In order to provide additional strength to resist the lengthwise pull on the side sheets 25, an auxiliary longitudinal tension beam has been arranged which constitutes the short struts 47, a plurality of which are disposed in spaced relation between the two forward struts 42, as best seen in Fig. 1.

The roof assembly 50 is made up as a subassembly and includes the arch beams 51, the roof sheet 52, and the top rub rail 53. This top rub rail is of peculiar configuration, but is generally that of an angle having the vertical leg 54 which is formed with a bead 55 to serve as a rub rail and which has the horizontal leg 56 terminating in a reinforcing angle 57. Welding material at 58 may affix this top rub rail and assembly to the top rail 40. The roof sheet 52 extends over this top rub rail 53, as at 59, so as to insure a rigid construction. It seems obvious that when the side beams have been assembled, that it is only necessary to dispose the top assembly thereon and create the bead 58 in order to have a rigid, sturdy construction.

The front section 60 is preferably of a curved beam of a suitable channel construction and a wall sheet 61 which will act as a closure. This front section can be disposed and suitably welded to the front ends of the side rails 7 and the front crossbearers 15.

The rear end of the trailer is formed by the corner posts 65 which are set in between the top rail 40 and the bottom rail 7 and suitably welded in place. These corner posts carry the hinges 66 on which the rear doors are supported for swinging movement.

The vertical sheer load in a construction of the type herein described is taken in diagonal tension along diagonal lines extending downwardly and inwardly from the top rail to the bottom rail toward the center of the side wall panel. It is only necessary to provide the vertical struts or stiffeners to prevent buckling of the plate to avoid buckling of the side wall. As an illustration, a trailer constructed in accordance with the invention and having an over-all length of 24 feet was loaded to 35,000 pounds and showed a deflection of only .035 of an inch at the center.

Broadly, the invention contemplates simple and economical trailer wherein a longitudinal tension beam is created by the side wall and top and bottom rail constructions.

What is claimed is:

1. A trailer body construction including a bottom longitudinal rub rail, said rail comprising a channel having a rub face, the bottom flange of said channel extending inwardly a greater distance than the upper flange of the channel, a strut seat extending above the face comprising a stepped portion extending inwardly, a floor flange above said portion and extending inwardly from said portion, and crossbearer members whose ends are step cut to interfit between said bottom flange and said floor flange.

2. A trailer body construction including a bottom longitudinal rub rail, said rail comprising a channel of irregular configuration having a rub face, the bottom flange of said channel extending inwardly a greater distance than the upper flange of the channel, a strut seat extending above the face comprising a stepped portion extending inwardly, a floor flange extending inwardly from said portion, a plurality of struts on said seat, a top rail enclosing the tops of the struts, a wall of sheet metal disposed on the top of said rub rail and against the flanges of said channel struts and said top rail and welded thereto to provide a unitary wall, strut and rail construction to constitute a longitudinal beam, a roof including a top rub rail to fit over said top rail and enclose the top of said wall sheet, and a front end section fitted and affixed to the front ends of said rails.

3. A trailer body construction including a bottom longitudinal rub rail, said rail comprising a channel of irregular configuration having a rub face, the bottom flange of said channel extending inwardly a greater distance than the upper flange of the channel, a strut seat extending above the face comprising a stepped portion extending inwardly, a floor flange extending inwardly from said portion, a plurality of struts on said seat, a top rail enclosing the tops of the struts, a wall of sheet metal disposed on the top of said rub rail and against the flanges of said channel struts and said top rail and welded thereto to provide a unitary wall, strut and rail construction to constitute a longitudinal beam, and an auxiliary tension element to resist lengthwise pull of the wall sheets including horizontal braces between the two forward struts.

RICHARD E. OSTLUND.